United States Patent
Luo

(10) Patent No.: US 10,061,548 B1
(45) Date of Patent: Aug. 28, 2018

(54) INFORMATION PROCESSING APPARATUS, INFORMATION PROCESSING METHOD, AND RECORDING MEDIUM THAT CALCULATE OPTIMIZED DRIVER SETTINGS BY EVOLUTION STRATEGY

(71) Applicant: KYOCERA Document Solutions Inc., Osaka (JP)

(72) Inventor: Qi Luo, Concord, CA (US)

(73) Assignee: KYOCERA Documents Solutions Inc., Osaka (JP)

( * ) Notice: Subject to any disclaimer, the term of this patent is extended or adjusted under 35 U.S.C. 154(b) by 0 days.

(21) Appl. No.: 15/476,397

(22) Filed: Mar. 31, 2017

(51) Int. Cl.
*G06F 3/12* (2006.01)

(52) U.S. Cl.
CPC .......... *G06F 3/1254* (2013.01); *G06F 3/1204* (2013.01); *G06F 3/1205* (2013.01); *G06F 3/1259* (2013.01); *G06F 3/1273* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 6,873,427 B1* | 3/2005 | Matsuda | ............ | H04N 1/00931 358/1.1 |
| 2005/0238205 A1* | 10/2005 | Kimura | ............ | G06K 9/03 382/112 |
| 2007/0165258 A1* | 7/2007 | Farrell | ............ | G06F 3/1205 358/1.13 |
| 2014/0036289 A1* | 2/2014 | Muroi | ............ | H04N 1/21 358/1.13 |
| 2014/0250287 A1* | 9/2014 | Akimoto | ............ | G06F 9/505 712/31 |

FOREIGN PATENT DOCUMENTS

JP    2000-037933 A    2/2000

* cited by examiner

*Primary Examiner* — Andrew H Lam
(74) *Attorney, Agent, or Firm* — Hawaii Patent Services; Nathaniel K. Fedde; Kenton N. Fedde

(57) ABSTRACT

Provided is information processing apparatus with possibly-making an optimal printing for an image forming apparatus perform. A job property acquiring part acquires a job property. A driver-settings acquiring part acquires driver settings at time of a job being outputted. A throughput time estimating part calculates estimated throughput time from a job property and driver settings. An optimized-settings calculating part calculates an optimized driver settings in which an output is possible in time shorter than estimated throughput time for the job property. A job output part makes a job output to the image forming apparatus by the calculated optimized driver settings.

18 Claims, 4 Drawing Sheets

INFORMATION PROCESSING APPARATUS, INFORMATION PROCESSING METHOD, AND RECORDING MEDIUM THAT CALCULATE OPTIMIZED DRIVER SETTINGS BY EVOLUTION STRATEGY

BACKGROUND

The present disclosure is related with an information processing apparatus, information processing method, and a recording medium that execute a device driver, or the like, for an image forming apparatus.

As typical technology, an image forming apparatus, such as an MFP (Multifunctional Peripheral) that can print a document and an image, are disclosed.

Also, in typical technology, a device driver for a computer that builds an optimal processing environment of a printing process by using information for the printing process stored in a management file is disclosed. The information stored in the management file is setting information for the printer, its state information, error information showing contents of the error occurred in the printer, date information showing time executed the printing process for print data, or the like. The information is managed as history-like.

SUMMARY

An information processing apparatus in the present disclosure includes a job property acquiring part, a driver-settings acquiring part, a throughput time estimating part, an optimized-settings calculating part, and a job outputting part. The job property acquiring part acquires a job property of a job. The driver-settings acquiring part acquires driver settings at time of the job being outputted. The throughput time estimating part calculates estimated throughput time by using the job property acquired by the job property acquiring part and the driver settings acquired by the driver-settings acquiring part. The optimized-settings calculating part calculates the optimized driver settings in which an output is possible for the job property acquired by the job property acquiring part in time shorter than the estimated throughput time calculated by the throughput time estimating part. The job outputting part makes the job output by using the optimized driver settings calculated by the optimized-settings calculating part.

An information processing method of the present disclosure is an information processing method executed by an information processing apparatus. A job property of a job is acquired. Driver settings at time of the job being outputted are acquired. Estimated throughput time is calculated from the acquired job property and the acquired driver settings. The optimized driver settings in which an output is possible in time shorter than the calculated estimated throughput time for the acquired job property are calculated. The job is made to output by using the calculated optimized driver settings.

A recording medium in the present disclosure is a computer-readable non-transitory recording medium that records a program executed by an information processing apparatus. The program acquires a job property of a job. Driver settings at time of the job being outputted are acquired. Estimated throughput time is calculated from the acquired job property and the acquired driver settings. The optimized driver settings in which an output is possible in time shorter than the calculated estimated throughput time for the acquired job property are calculated. The job is made to output by the calculated optimized driver settings.

DETAILED DESCRIPTION

Embodiment

[The System Configuration of Image Forming System X]

Figure 1:
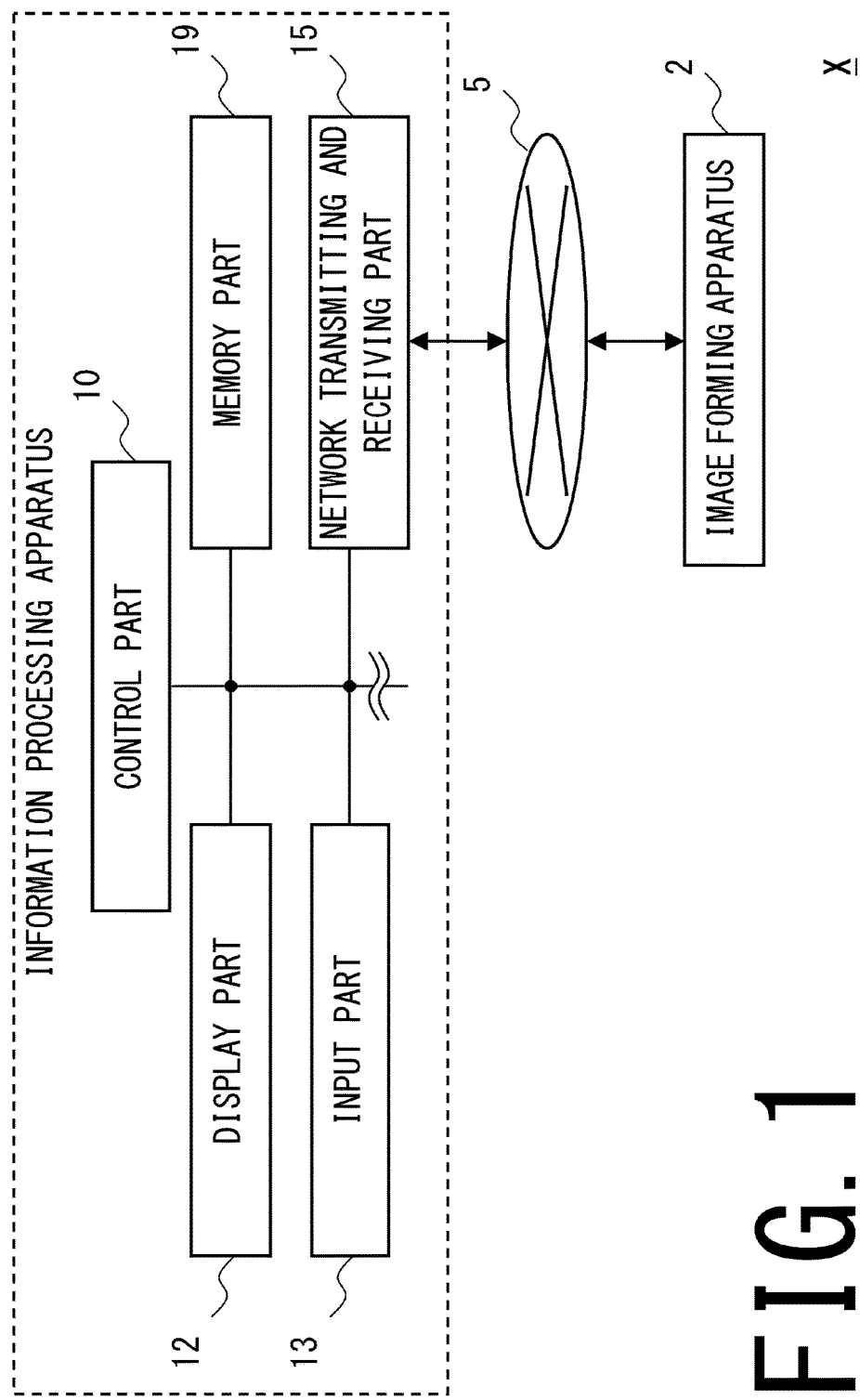
FIG. 1 is a system configuration figure of the image forming system according to an embodiment of the disclosure.

Firstly, as refer to FIG. 1, a configuration of image forming system X according to an embodiment is described. As for image forming system X, for example, information processing apparatus 1 is connected with image forming apparatus 2 via network 5. Information processing apparatus 1 is a computer, such as PC (Personal Computer) or a smart phone. Image forming apparatus 2 is image forming apparatus, such as an MFP or a printer. Networks 5 are LAN (Local Area Network), WAN (Wide Area Network), or the like.

In addition, in a configuration, information processing apparatus 1 and image forming apparatus 2 may be directly-connected without network 5. Also, it may have a plurality of information processing apparatus 1 and/or image forming apparatus 2.

Figure 2:
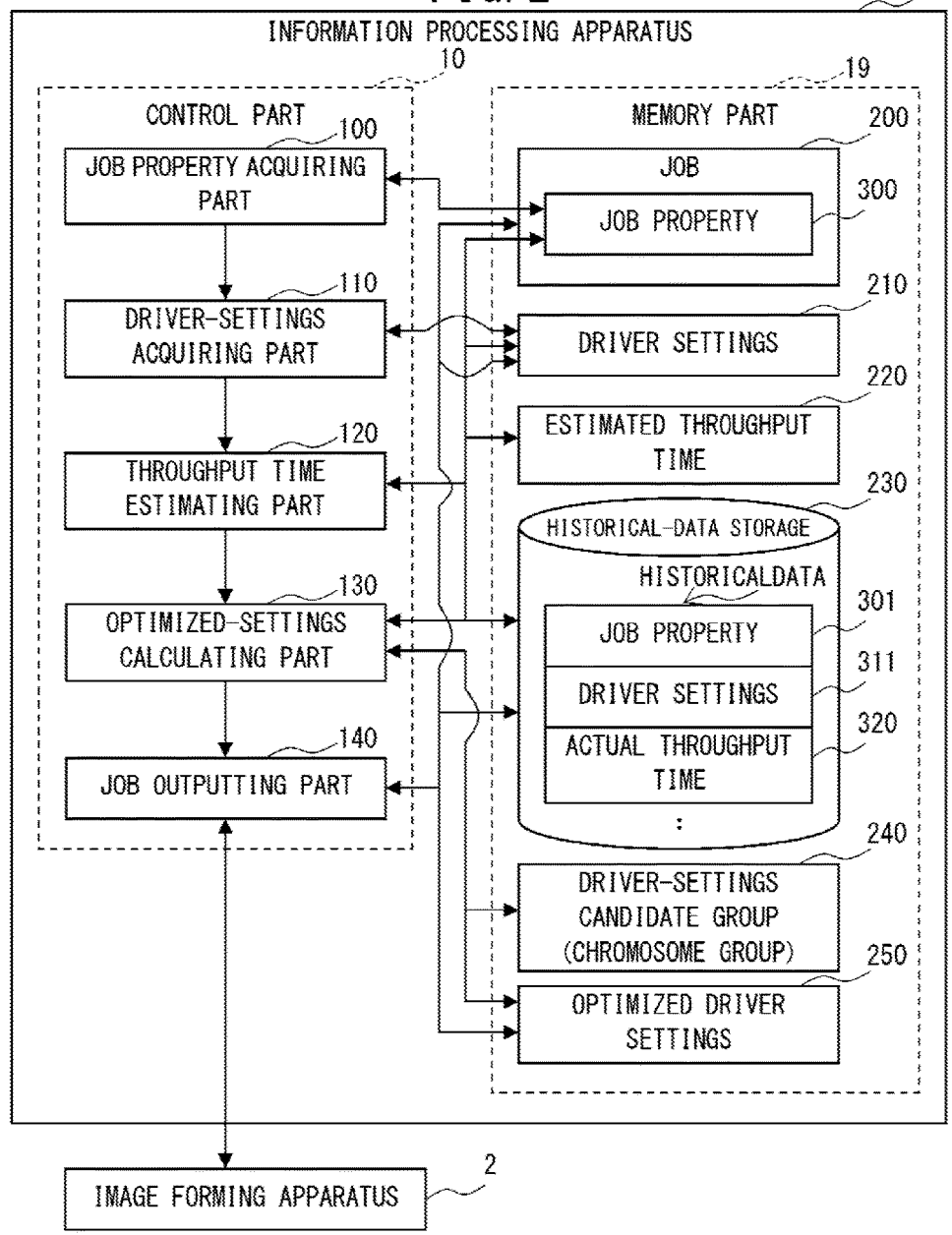
FIG. 2 is a block diagram showing a control configuration of the image forming apparatus as shown in FIG. 1.

As refer to FIG. 2, Information processing apparatus 1 includes control part 10, display part 12, input part 13, network transmitting and receiving part 15, and the memory part 19, or the like, as hardware resources. Each part of information processing apparatus 1 is connected to control part 10, and control part 10 controls a whole device.

Control part 10 is an information processing unit, such as CPU (Central Processing Unit). Control part 10 reads a control program stored in memory part 19, executes the control program, and is operated as each functional block as described later. Also, control part 10 controls the whole device corresponding to specified instructions information inputted by input part 13.

Display part 12 is a liquid crystal display, organic EL display, or the like. On display part 12, driver settings 210 (FIG. 2) in image forming apparatus 2 is displayed by using GUI (Graphical User Interface.)

Input part 13 is a touch panel, a keyboard, a mouse, or the like. Input part 13 acquires user instructions. The user instructions include setting instructions for driver settings 210. Also, the user instructions include whether optimized driver settings 250 are selected or not.

Network transmitting and receiving part 15 is a device for connecting with LAN or WAN. Via network transmitting and receiving part 15 is passed, information processing apparatus 1 is connected to network 5, and it can transmit and receive information to image forming apparatus 2. The transmitting and receiving information includes job 200 as described later and commands to start, end, and acquire state for job 200, or the like.

Memory part 19 is a non-transitory recording medium in which the computer can read and/or write. A program and data are stored in memory part 19. The program includes OS (Operation System) for operation-controlling information processing apparatus 1, a device driver for performing control of image forming apparatus 2, an application software being executed under the OS, or the like. Memory part 19 may be un-mountable, and the stored contents may be installed from other non-transitory recording media or may be backed up.

Control part 10 and network transmitting and receiving part 15 may be integrally formed as like the so-called SOC (System On a Chip,) CPU with built-in GPU, or the like. Also, control part 10 and network transmitting and receiving part 15 may include a non-transitory recording medium. Also, display part 12 and input part 13 may be a touch panel, or the like, which are integrally-formed. Also, information processing apparatus 1 may include other hardware units.

[The Control Configuration of Information Processing Apparatus 1]

Here, as refer to FIG. 2, a control configuration of information processing apparatus 1 is explained. Control part 10 in information processing apparatus 1 includes job property acquiring part 100, driver-settings acquiring part 110, throughput time estimating part 120, optimized-settings calculating part 130, and job outputting part 140.

Memory part 19 stores job 200, driver settings 210, estimated throughput time 220, historical-data storage 230, driver-settings candidate group 240, and optimized driver settings 250.

Job property acquiring part 100 acquires job property 300 of job 200. In detail, job property acquiring part 100 analyzes job 200 stored in memory part 19 and acquires property and setting information included in job 200 as job property 300.

Driver-settings acquiring part 110 acquires driver settings 210 at the time of job 200 being outputted. Also, driver-settings acquiring part 110 acquires driver settings 210 stored in memory part 19.

Throughput time estimating part 120 calculates estimated throughput time 220 from job property 300 acquired by job property acquiring part 100 and driver settings 210 acquired by driver-settings acquiring part 110. Also, throughput time estimating part 120 may calculate estimated throughput time 220 by historical data stored in historical-data storage 230.

Optimized-settings calculating part 130 calculates optimized driver settings 250 in which an output is possible in time shorter than throughput time estimated by throughput time estimating part 120 for job property 300 acquired by job property acquiring part 100. Also, optimized-settings calculating part 130 may generate a plurality of different driver-settings candidates and may calculate optimized driver settings 250 from the plurality of different driver-settings candidates. Thereby, optimized-settings calculating part 130 may calculate optimized driver settings 250 by using a genetic algorithm. In this case, the plurality of different driver-settings candidates are chromosomes, and each of the chromosomes includes a sequence of different setting information. Optimized-settings calculating part 130 calculates a fitness score corresponding to estimated throughput time 220 in each chromosome, performs crossover and mutation for the chromosomes, and repeatedly-selects the optimal chromosomes. Also, optimized-settings calculating part 130 may compare and search job property 301 stored in historical data stored in historical data storage 230 with each of the chromosomes. Thereby, optimized-settings calculating part 130 may calculate the fitness score correspond to actual throughput time 320 in historical data. Also, if there is no job property 300 that is fully-matched in the comparison, optimized-settings calculating part 130 may calculate the fitness score by using a plurality of actual throughput time 320 of corresponding job properties 301.

Job outputting part 140 makes job 200 output by using optimized driver settings 250 calculated by optimized-settings calculating part 130.

Job 200 includes, for example, data, a command, or the like, which a user makes by using an application software, for outputting to image forming apparatus 2. Jobs 200 may be a printing job, remote scan job, remote facsimile job, or the like. In the present embodiment, it explains an example that job 200 is a printing job. In this case, job 200 may be a data written in PDL (Page Description Language.)

Driver settings 210 are setting data for outputting job 200 in image forming apparatus 2. Driver settings 210 may be set up by a user by using input part 13 and display part 12 with GUI of the control program, such as the printer driver. Also, about driver settings 210, an initial value may be automatically set up by the setting information of job 200, or default settings may be applied by an application. Driver settings 210 may include, for example, PDL mode, downloadable font settings, resolution, eco-print level, halftone screen settings, watermark settings, or the like. In these, downloadable font settings are settings whether a downloadable font is used or embedding font is used. Also, the resolution may not be a simple density of dots, and, for example, balance of speed and resolution, or the like, may be specified as the resolution. Also, the eco-print level is a setting to reduce quantity of consuming toner as a level by printing lightly, or the like. Also, the watermark setting is setting of a watermark of "confidential," a company logo, or the like. Watermark settings include settings of a watermark angle, watermark size, or the like. The watermark angle indicates an angle of a watermark, and the watermark size indicates a size of a watermark.

Estimated throughput time 220 is an estimated value of the throughput time for outputting job 200 when driver settings 210 are applied. Estimated throughput time 220 includes, for example, transmitting time of job 200 to an image forming apparatus and outputting time per page of job 200.

Historical-data storage 230 is a database, or the like, which stores historical data. For example, historical-data storage 230 stores job property 301, driver settings 311, and actual throughput time 320, or the like, at the time of a former job being outputted as historical data.

Actual throughput time 320 is, for example, in the job outputting time, an average value of throughput time of the first page and the throughput time per page being equalized the throughput time of the remaining pages by number-of-pages, or the like. That is, for example, about 3-page job, if the first sheet is outputted in 18 seconds and the two remaining sheets are outputted in 12 seconds, actual throughput time 320 is calculated with $(18+(12/2))/2=12$ (second/page).

In addition, the average value of throughput time per page may just be used as actual throughput time 320. Also, it is also possible that the historical data do not include driver settings 210.

Driver-settings candidate group 240 includes a plurality of different driver-settings candidates. Also, driver-settings candidate group 240 includes the chromosomes (chromosome group) that are sequences of different setting information as a plurality of different driver-settings candidates. The configuration of the chromosomes is described later.

Optimized driver settings 250 is the optimal driver settings calculated by optimized-settings calculating part 130. Optimized driver settings 250 is the estimated driver settings that an output is possible in time shorter than the time of outputting job 200 by driver settings 210. That is, if optimized driver settings 250 is present and job 200 is outputted by using the settings, throughput time will be shorter than estimated throughput time 220. Also, optimized driver settings 250 may be the driver-settings candidates in the chromosome having the largest fitness score in the group of the chromosomes calculated by optimized-settings calculating part 130 by the genetic algorithm.

Also, job 200 includes job property 300. Job property 300 is data corresponding to the type and the characteristic of job 200. If job 200 is a printing job, job property 300 includes, for example, PDL mode, printed application type, presence or absence of embedding font, quantity of image, number of layers, advanced settings, or the like. In these properties, advanced settings may include image settings, adjustment setting, watermark settings, or the like. In addition, job property 300 may include presence or absence and type of image, resolution, performance of image forming apparatus to be outputted, user information, or the like.

Here, control part 10 of information processing apparatus 1 executes the control program stored in memory part 19 and is functioned as job property acquiring part 100, driver-settings acquiring part 110, throughput time estimating part 120, optimized-settings calculating part 130, and job outputting part 140. Also, each part of the above-mentioned information processing apparatus 1 serves as hardware resources that execute the image forming method in the present disclosure.

[Optimized-Driver-Settings Calculation Output Process in Information Processing Apparatus 1]

Figure 3:
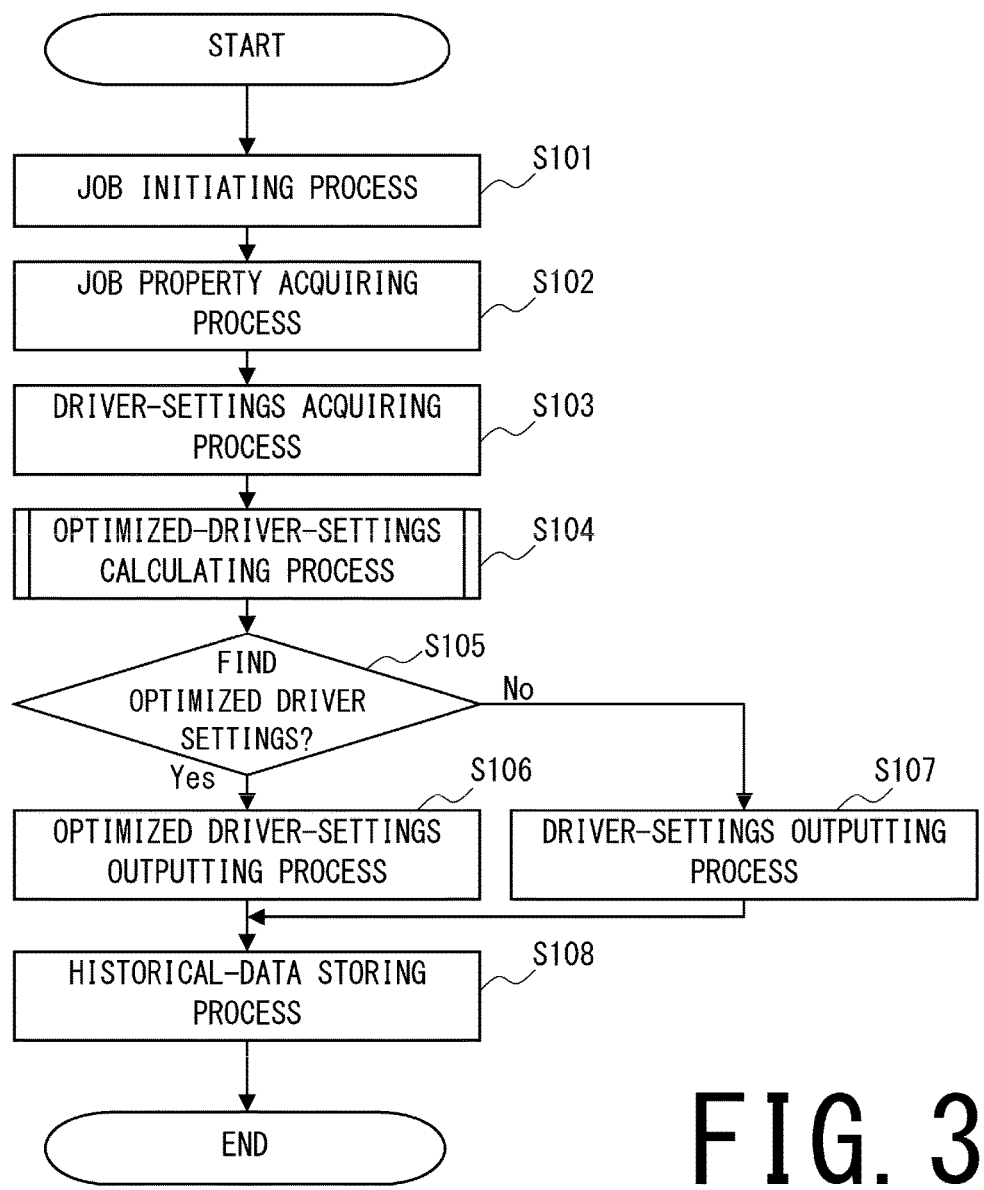
FIG. 3 is a flow diagram of the optimized-driver-settings calculation output process according to the embodiment of the disclosure.

Then, as refer to FIG. 3, the optimized-driver-settings calculation output process by using an evolution strategy in information processing apparatus 1 according to the embodiment in the disclosure is explained. In the optimized-driver-settings calculation output process in the present embodiment, firstly, it acquires job property 300 of job 200. Then, driver settings 210 at the time of job 200 being outputted are acquired. Also, estimated throughput time 220 is calculated from acquired job property 300 and acquired driver settings 210. Then, for received acquired job property 300, optimized driver settings 250 in which an output is possible in time shorter than calculated estimated throughput time 220 are calculated. If the calculated optimized driver settings 250 are present, job 200 is outputted by using calculated optimized driver settings 250. Also, if optimized driver settings 250 are not present, job 200 is outputted by using driver settings 210.

In the optimized-driver-settings calculation output process, mainly, control part 10 of information processing apparatus 1 collaborates with each part and executes the program stored in memory part 19 by using hardware resources.

In the following, as refer to the flow chart in FIG. 3, the details of the optimized-driver-settings calculation output process are explained for each step.

(Step S101)

Firstly, job property acquiring part 100 performs a job initiating process. When printing, or the like, are performed by an application, job property acquiring part 100 spools job 200 for printing and stores it in memory part 19. As for job 200, default job property 300 is set up in this state. Also, when print setting is done with GUI of the device driver, or the like, it is reflected in job property 300 in job 200 and driver settings 210.

(Step S102)

Then, job property acquiring part 100 performs a job property acquiring process. Job property acquiring part 100 analyzes PDL, or the like, in job 200, acquires job property 300, and stores it in memory part 19.

(Step S103)

Then, driver-settings acquiring part 110 performs a driver-settings acquiring process. Driver-settings acquiring part 110 refers to driver settings 210 stored in memory part 19. Thereby, it enables driver-settings acquiring part 110 to acquire driver settings 210 at the time of job 200 being outputted.

(Step S104)

Then, optimized-settings calculating part 130 performs an optimized-driver-settings calculating process. Optimized-settings calculating part 130 calculates optimized driver settings 250 in which an output is possible in time shorter than the throughput time stored in memory part 19. In that case, if optimized driver settings 250 are found, optimized-settings calculating part 130 may show it as a recommendation and may ask permission of changing to the optimized settings 250 for the user. For example, a dialog, "If it changes into the settings, based on historical data, 3-time faster performance will be obtained. Do you wish to change?" or the like, may be displayed and may be asked for a user about the availability of changing the settings.

Further, details of actual optimization procedure of the optimized-driver-settings calculation process is described later.

(Step S105)

Then, optimized-settings calculating part 130 determines whether optimized driver settings 250 is found or not. Optimized-settings calculating part 130 determines it as Yes if at least one of optimized driver settings 250 is calculated and stored it in memory part 19. Optimized driver settings 250 determine it as No if other cases. In addition, if optimized driver settings 250 are found, but the user refuses to change to optimized driver settings 250, it is also determined as No.

In Yes, optimized driver settings 250 advance a process to Step S106.

In No, optimized driver settings 250 advance a process to Step S107.

(Step S106)

If optimized driver settings 250 is found, job outputting part 140 performs optimized-driver-settings outputting process. Job outputting part 140 makes job 200 transmit and output to image forming apparatus 2 by using calculated optimized driver settings 250.

Subsequently, job outputting part 140 advances a process to Step S108.

(Step S107)

If optimized driver settings 250 are not found, job outputting part 140 performs driver-settings outputting process. Job outputting part 140 makes job 200 transmit and output to image forming apparatus 2 by using driver settings 210 set by the user.

Subsequently, job outputting part 140 advances a process to Step S108.

(Step S108)

Here, optimized-settings calculating part 130 performs a historical-data storing process. In the present embodiment, depending on a model and environment, image forming apparatus 2 may have a variation of the function, such as color capable or monochrome-only machine, having PDF (Portable Document Format) direct print function or not, embedding font or not, and version of firmware. Therefore, optimized-settings calculating part 130 measures the throughput time of job 200. Then, at the time of job 200 being outputted, optimized-settings calculating part 130 stores job property 301, driver settings 311, and actual throughput time 320 for job 200 in historical-data storage 230 as historical data.

In addition, if optimized driver settings 250 are found, driver settings 311 at the time of being outputted may be optimized driver settings 250. If it is not, they may be driver settings 210 set by the user. Thereby, the optimization ratio of optimized driver settings 250 in the next time and after can be raised.

By the above-mentioned, the optimized-driver-settings calculation output process according to the embodiment is ended.

Figure 4:
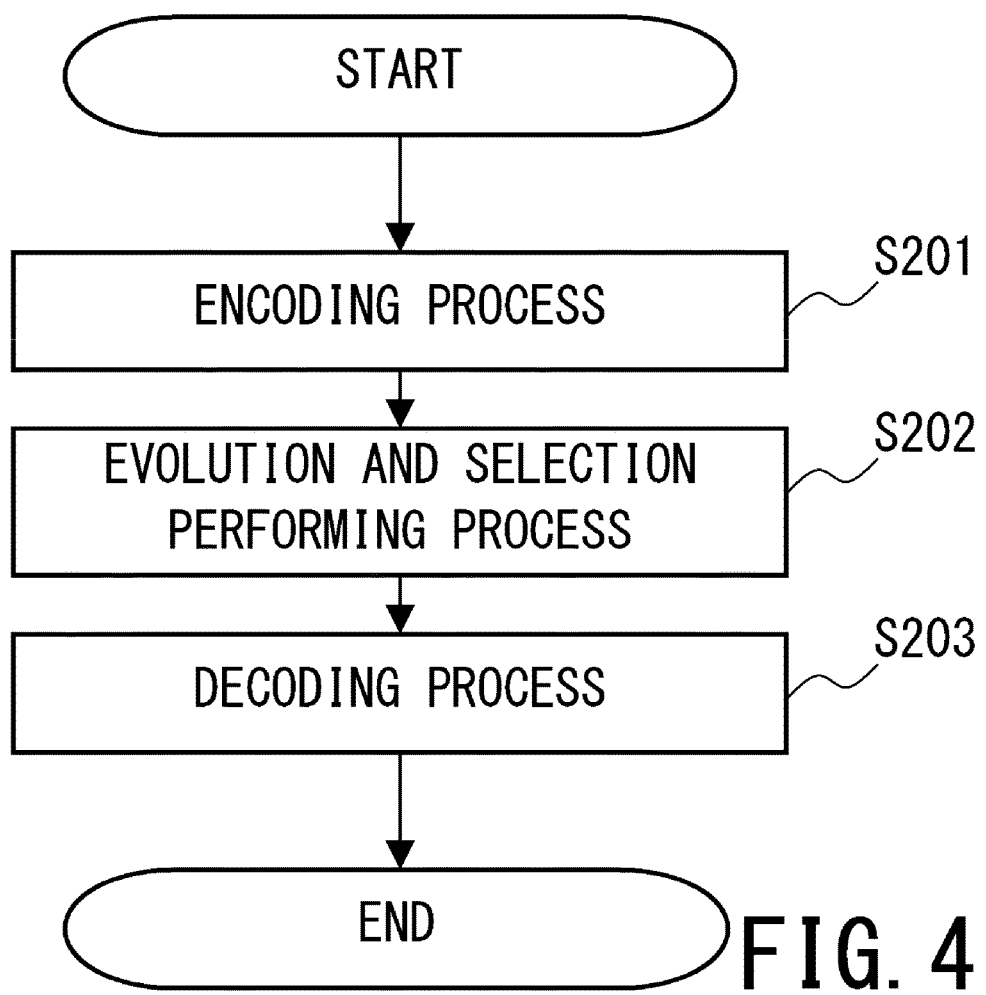
FIG. 4 is a flow diagram of the optimized-driver-settings calculation process as shown in FIG. 3.

Then, as refer to FIG. 4, it explains the details of the optimized-driver-settings calculation process according to the embodiment in the disclosure.

(Step S201)

Firstly, optimized-settings calculating part 130 performs encoding process. Optimized-settings calculating part 130 generates driver-settings candidate group 240, which is a plurality of different driver-settings candidates, and calculates optimized driver settings 250 by using them. In this process, for example, a chromosome group, which is a plurality of sequences of setting information and a solution used for a genetic algorithm, is generated as the driver-settings candidate group 240.

In detail, optimized-settings calculating part 130 generates bit arrays as the chromosomes. When job 200 is a printing job, each of the setting information for the print driver is shown as a bit in the bit array. Optimized-settings calculating part 130 may select only the settings that do not spoil the user's output intention for job 200, greatly, even if it changes in each chromosome. The each bit in the array is encoded as follows, for example:

PDL mode→Specialized PDL:00, PCL:01, PDF:10, PCL XL:11

Downloadable-font setting→downloadable-font use:1, embedding font use:0

Resolution→300 dpi:00, 600 dpi:01, fast 1200:10, fine 1200:11

Eco-print level (0-6)→0:000, 1:001, . . . , 6:110

Halftone-screen setting→Normal: 00, gradation priority: 01, resolution priority:10, high definition:11

Watermark angle (−180 to 180 degrees)→−180:000000, −170:000001 . . . Watermark size (24, 30, 36, . . . , 72 points)→24:000, . . . , 72:111

In addition, the watermark angle and the watermark size are included in watermark settings. These watermark settings may be encoded only when the user instructs to addition of the watermark.

For the chromosome group, an area is assigned in memory part 19. Then, firstly, one chromosome is generated where driver settings 210 set up by the user is reflected: For example, if the user's driver settings 210 is a case that: PDF mode, use embedding font (no downloadable font), resolution 600 dpi, eco-print OFF (0), halftone screen setting normal, watermark angle 30 degrees, and watermark size 36 points, it encodes as like the following array as the chromosome:

Chromosome: 10 (PDF) 0 (font) 01 (resolution) 000 (eco-print) 00 (half-tone) 010101 (watermark angle) 010 (watermark size)

(Step S202)

Then, optimized-settings calculating part 130 performs evolution and selection performing process. Optimized-settings calculating part 130 randomly perform crossover and mutation to the chromosome of the user's driver settings 210 as mentioned above for a plurality of times. Thereby, optimized-settings calculating part 130 generates the chromosome group. Here, crossover means swapping two chromosomes at a part of a random bit. For example, 01010→crossover at position 3→10101

10101→crossover at position 3→10010

Also, mutation is reversing a bit in a chromosome. For example,

00000→mutation at position 2→01000

Optimized-settings calculating part 130 calculates a fitness score for each chromosome in the generated the chromosome group. The fitness score corresponds to the estimated throughput time at the time of outputting job 200 in the driver-settings candidate encoded in the chromosomes. In this case, optimized-settings calculating part 130 uses historical data to find the fitness score. Specifically, optimized-settings calculating part 130 may calculate a fitness score by using actual throughput time 320, which is equalized per page, as mentioned above in the historical data. Thereby, optimized-settings calculating part 130 calculates the fitness score in each chromosome corresponding to estimated throughput time. Then, the chromosomes are sorted in order of the fitness score. Further, for example, optimized-settings calculating part 130 perform crossover and mutation for chromosomes, which fitness scores are approximately half of higher rank, to generate ascendant chromosomes and replaces lower-ranking chromosomes with the ascendant chromosomes. Thereby, the optimal chromosomes are repeatedly-selected. For the repetition number, optimized-settings calculating part 130, for example, may set a specific number of times, which may have been calculated, previously.

Also, optimized-settings calculating part 130, for example, may set a condition until the maximum fitness score being not changed in a result of a repetition.

Also, optimized-settings calculating part 130 may compare and search job property 301 and driver settings 311 in historical data with chromosomes and may calculate a fitness score from corresponding actual throughput time 320.

Also, if there are no job property 300 and driver settings 210 that is not fully-matched at the time of comparison, optimized-settings calculating part 130 calculates a fitness score by using a plurality of related actual throughput time 320 in the historical data.

In detail, for example, in case of PDF, 600 dpi, and 30 watermark angles, as mentioned above, optimized-settings calculating part 130 may select any of the following three cases and may calculate a fitness score.

Case 1:

In the case that optimized-settings calculating part 130 has successfully searched driver settings 311 in the historical data where settings of the chromosome are completely-matched, optimized-settings calculating part 130 calculates actual throughput time 320 in the historical data as the fitness score, that is, corresponding throughput time.

Case 2:

In this case, optimized-settings calculating part 130 has not searched any job property 301 and driver settings 311 in historical data where settings of the chromosome are completely-matched. In the case, optimized-settings calculating part 130 performs weighting of two actual throughput time 320 corresponding to two related job property 301s and driver settings 311 in historical-data. For example, a case of having searched the following two related historical data is explained:

1. PDF, 600 dpi, 0 degree→P1 Seconds
2. PDF, 600 dpi, 60 degrees→P2 Seconds

If the settings of the chromosome are PDF, 600 dpi, 30 degrees, optimized-settings calculating part 130 may calculate the fitness score=(P1*(30−0)+P2*(60−30))/60=X1 (second/page). In this case, the calculated fitness score itself is the corresponding throughput time.

Case 3:

In this case, optimized-settings calculating part 130 has searched job property 301 and driver-settings 311 in historical data where settings of the chromosome are partially-matched. For example, a case of having searched the following historical data is explained:

1. PDF, 600 dpi, No Watermark→Q1 Seconds
2. PCL, 600 dpi, No Watermark→Q2 Seconds In this case, it is possible to perform weighting based on how the settings are matched. The example case of the above-mentioned chromosome, PDF, 600 dpi, and 30 degrees, is explained. In "1.," since two matched settings, "PDF" and "600 dpi," are present, weight value m1=2 is set. In "2.," since only one matched setting, "600 dpi," is present, weight value m2=1 is set. Therefore, optimized-settings calculating part 130 possibly calculates fitness score=(Q1*(m1+1)+Q2*(m2+1))/(m1+1+m2+1)=X2 (second/page). In this case, it is also the calculated fitness score is the corresponding throughput time.

(Step S203)

Then, optimized-settings calculating part 130 performs a decoding process. Optimized-settings calculating part 130 decodes the chromosome (driver-settings candidate) having the largest fitness score in the chromosomes group (driver-settings candidate group) and stores the settings in optimized driver settings 250.

In addition, if the largest fitness score is the same as estimated throughput time 220 or more, optimized-settings calculating part 130 may be determined that it cannot have found (calculated) optimized driver settings 250. Also, first of all, if the driver settings of the chromosome having the largest fitness score are the same as driver settings 210 where the user set up, optimized-settings calculating part 130 may be determined that it cannot have found (calculated) optimized driver settings 250.

By the above-mentioned, the optimized-driver-settings calculation process according to the embodiment is ended.

The following effects can be obtained with a configuration as mentioned above.

For printing, or the like, the performance how much time is needed to complete a job (throughput time) is critical. Especially, this is remarkable in case that there is a large amount of printing jobs. One major factor that can affect the performance is a setting in a PDL mode of a driver. In many printer drivers, a PDL mode is selectable, such as exclusive PDL, PS (PostScript, registered trademark), PCL, or PDF mode. Each of them has some pros and cons, and in many cases, printing quality itself will not be changed so much. However, if applications differ or the contents of the data in a job differ, the print performance is significantly-changed according to the difference in PDL mode. For example, if the application is a kind of photo-retouch or a word processor, performance is much different in the PDL mode. Also, the data in job, for example, such as a plain text file, a quality photograph, a multilayer document, or the like, affect in the performance, substantially. In addition, many other print settings may also influence to the performance, greatly. For example, in case that higher printing quality is not required as like a proofreading print, setting high level of "eco-print" makes performance increase, significantly. Also, in case that a user does not care about an angle of a watermark, setting the angle 0 degree will speed up the printing, greatly. However, in typical technology, all the above setting effect is not considered.

About that matter in case, information processing apparatus 1 according to an embodiment in the present disclosure includes job property acquiring part 100, driver-settings acquiring part 110, throughput time estimating part 120, optimized-settings calculating part 130, and job outputting part 140. Job property acquiring part 100 acquires job property 300. Driver-settings acquiring part 110 acquires driver settings 210 at the time of job 200 being outputted. Throughput time estimating part 120 calculates estimated throughput time 220 from job property 300 acquired by job property acquiring part 100 and driver settings 210 acquired by driver-settings acquiring part 110. Optimized-settings calculating part 130 calculates optimized driver settings 250 in which an output is possible in time shorter than estimated throughput time 220 calculated by throughput time estimating part 120 for job property 300 acquired by job property acquiring part 100. Job outputting part 140 makes job 200 output by optimized driver settings 250 calculated by optimized-settings calculating part 130.

As configured in this way, it becomes possible to output job 200 with the better performance by using optimized driver settings 250.

Also, in typical technology, the firmware of image forming apparatus 2, or the like, are improved, and performance is raised.

On the other hand, as like information processing apparatus in the present embodiment, by raising performance in information processing apparatus 1 itself, it becomes possible to raise performance without changing the firmware in the image forming apparatus.

Also, information processing apparatus 1 according to the embodiment in the present disclosure further includes historical-data storage 230 that stores job property 300, driver settings 210, and actual throughput time 320 at the time of former job 200 being outputted as historical data. Also, throughput time estimating part 120 calculates estimated throughput time 220 by the historical data stored in historical-data storage 230.

As configured in this way, driver settings that can raise performance is selectable from historical data.

Also, in information processing apparatus 1 according to the embodiment in the present disclosure, optimized-settings calculating part 130 generates a plurality of different driver-settings candidates and calculates optimized driver settings 250 from the plurality of different driver-settings candidates.

As configured in this way, by using an evolution strategy, better driver settings can be select, certainly.

Also, in information processing apparatus 1 according to the embodiment in the present disclosure, the plurality of different driver-settings candidates are chromosomes that are sequences of different setting information. Also, optimized-settings calculating part 130 calculates a fitness score corresponding to an estimated throughput time in each chromosome. Also, optimized-settings calculating part 130 calculates optimized driver settings 250 by genetic algorithm that perform crossover and mutation to the chromosomes and repeatedly-selects the optimal chromosomes.

As configured in this way, it becomes easy to search a combination of better settings by using the genetic algorithm.

Also, in information processing apparatus 1 according to the embodiment in the disclosure, optimized-settings calculating part 130 compares and searches job property 300 and driver settings 210 in historical data stored in historical-data storage 230 with chromosomes. Thereby, optimized-settings calculating part 130 calculates a fitness score from corresponding actual throughput time 320.

As configured in this way, it enables to discover the combination of the optimal settings in a user environment based on historical data.

Also, information processing apparatus 1 according to the embodiment in the present disclosure, optimized-settings calculating part 130 calculates a fitness score by using actual throughput time 320$s$ corresponding to related job property 300$s$ and driver settings 210$s$ when there is no job property 300 and driver settings 210 that is fully-matched in comparison.

As configured in this way, even if job has not outputted by using the same job property 300 or driver settings 210 formerly, it becomes possible to search better settings by using approximate values.

OTHER EMBODIMENTS

In addition, in the above-mentioned embodiment, an example is explained that only the settings being not spoil much about the output intention of job 200 are selected and encoded as the chromosomes in the genetic algorithm. However, all the settings in a device driver, or the like, may be selected and chromosomes may be encoded. Also, it may be encoded settings to change a quantity of an image (image rate) in job 200 to the chromosomes. This image rate is a value to adjust a quantity of an image by printing the image smaller or thinner out at the time of outputting. In this case, for example, if settings of the driver are "monochrome", "resolution minimum", "image rate 0%", and "no watermark" are adopted, the shortest throughput time can be obtained, and this may spoil a user intention, greatly. Therefore, "difference of output intention" that is a difference between job property 300 in job 200 and settings of a chromosome may be calculated, and the penalty that subtracts this value from the fitness score at a specific rate may be set up.

Also, in the above-mentioned embodiment, the combination of the optimal settings is selected by the genetic algorithm. However, a fitness score may search for the combination of settings by methods, such as round robin search, width priority search, depth-first search, and the min-max method.

As configuration in this way, job 200 can be outputted by the optimal settings according to the user intention.

Also, the above-mentioned embodiment is explained an example of the process that job 200 is a printing job. However, the present disclosure can also be applied to a remote scan job, a remote facsimile job, or the like, other than a print job. In this case, historical data for applying the type of each job 200 may be stored.

As configured in this way, it is also possible to have performance to output optimized job 200 other than a printing job.

Also, in the above-mentioned embodiment, it discloses that only one image forming apparatus 2 is present. However, it may be a configuration that a plurality of image forming apparatus 2$s$ are used. In this case, unique ID for the image forming apparatus, or the like, may be included in historical data, appropriate image forming apparatus 2 to output may be selected, and this selection may be included in optimized driver settings 250.

As configured in this way, it becomes possible to output job 200 at high speed with image forming apparatus 2, which is more appropriate to output job 200.

Also, the present disclosure is applicable to a system having information processing apparatus other than the image forming apparatus. That is, it may be a configuration by using a network scanner, a scanner and a server separately-connected with USB, or the like. Also, it is applicable to a device driver, or the like, for an apparatus that is needed to set up a combination of a large number of settings.

Also, the configuration and operation in the above-mentioned embodiment are an example, and it cannot be over-emphasized that it can change suitably and can execute in the range that does not deviate from the aim of the present disclosure.

What is claimed is:

1. An information processing apparatus comprising:
   a job property acquiring part that acquires a job property of a job;
   a driver-settings acquiring part that acquires driver settings at time of the job being outputted;
   a throughput time estimating part that calculates estimated throughput time by using the job property acquired by the job property acquiring part and the driver settings acquired by the driver-settings acquiring part;
   an optimized-settings calculating part that calculates optimized driver settings in which an output is possible in a time shorter than the estimated throughput time calculated by the throughput time estimating part for the job property acquired by the job property acquiring part; and
   a job output part that outputs the job by using the optimized driver settings calculated by the optimized-settings calculating part.

2. The information processing apparatus according to claim 1, further comprising
   a historical-data storage that stores a job property, driver settings, and actual throughput time at time of a former job being outputted as historical data; wherein
   the throughput time estimating part calculates the estimated throughput time by the historical data stored in the historical-data storage.

3. The information processing apparatus according to claim 2, wherein
   the optimized setting calculating part generates a plurality of different driver-settings candidates and calculates optimized driver settings from the plurality of different driver-settings candidates.

4. The information processing apparatus according to claim 3, wherein
   the plurality of different driver-settings candidates are chromosomes with sequences of different setting information; and
   the optimized-settings calculating part calculates optimized driver settings by calculating a fitness score corresponding to throughput time in each chromosome, performing crossover and mutation the chromosomes, and repeatedly-selecting optimal chromosomes.

5. The information processing apparatus according to claim 4, wherein
   the optimized-settings calculating part calculates the fitness score from a corresponding throughput time by comparing and searching the job property and the driver settings in the historical data with the chromosomes.

6. The information processing apparatus according to claim 5, wherein
the optimized-settings calculating part,
when there are no job property and driver settings that performs full match in comparison, calculates the fitness score by using the actual throughput time corresponding to a plurality of related job properties and driver settings.

7. An information processing method executed by an information processing apparatus, comprising the steps of:
acquiring a job property of a job;
acquiring driver settings at time of the job being outputted;
calculating estimated throughput time by using the acquired job property and the acquired driver settings;
calculating optimized driver settings in which an output is possible in a time shorter than the calculated estimated throughput time for the acquired job property; and
outputting the job by using the calculated optimized driver settings.

8. The information processing method according to claim 7, further comprising
storing job property driver settings, and actual throughput time at time of a former job being outputted as historical data; and
calculating the estimated throughput time by stored historical data.

9. The information processing method according to claim 8, further comprising
generating a plurality of different driver-settings candidates; and
calculating optimized driver settings from the plurality of different driver-settings candidates.

10. The information processing method according to claim 9, wherein
the plurality of different driver-settings candidates are chromosomes with sequences of different setting information; and the method further comprises
calculating optimized driver settings by calculating a fitness score corresponding to throughput time in each chromosome, performing crossover and mutation the chromosomes, and repeatedly-selecting optimal chromosomes.

11. The information processing method according to claim 10, further comprising
calculating the fitness score from corresponding throughput time by comparing and searching the job property and the driver settings in the historical data with the chromosomes.

12. The information processing method according to claim 11, further comprising
calculating, when there are no job property and driver settings that perform full match in comparison, the fitness score by using the actual throughput time corresponding to a plurality of related job properties and driver settings.

13. A computer-readable non-transitory recording medium recording a program executed by an information processing apparatus, wherein the program includes the steps of:
acquiring a job property of a job;
acquiring driver settings at time of the job being outputted;
calculating estimated throughput time from the acquired job property and the acquired driver settings;
calculating optimized driver settings in which an output is possible in time shorter than the calculated estimated throughput time for the acquired job property; and
outputting the job by using the calculated optimized driver settings.

14. The recording medium according to claim 13, wherein the program includes the steps of
storing job property, driver settings, and actual throughput time at time of a former job being outputted as historical data; and
calculating the estimated throughput time by stored historical data.

15. The recording medium according to claim 14, wherein the program includes the steps of
generating a plurality of different driver-settings candidates; and
calculating optimized driver settings from the plurality of different driver-settings candidates.

16. The recording medium according to claim 15, wherein
the plurality of different driver-settings candidates are chromosomes with sequences of different setting information; and
the program includes the steps of calculating optimized driver settings by calculating a fitness score corresponding to throughput time in each chromosome, performing crossover and mutation the chromosomes, and repeatedly-selecting optimal chromosomes.

17. The recording medium according to claim 16, wherein the program includes the step of
calculating the fitness score from corresponding throughput time by comparing and searching the job property and the driver settings in the historical data with the chromosomes.

18. The recording medium according to claim 17, wherein the program includes the step of
calculating, when there are no job property and driver settings that perform full match in comparison, the fitness score by using the actual throughput time corresponding to a plurality of related job properties and driver settings.

* * * * *